United States Patent Office 3,441,398
Patented Apr. 29, 1969

3,441,398
METHOD OF REMOVING ION FROM SALT BATH BY ION EXCHANGE REGENERATION
Albert R. Hess, Pittsburgh, Pa., assignor to PPG Industries, Inc., a corporation of Pennsylvania
Continuation-in-part of application Ser. No. 388,371, Aug. 10, 1964. This application Oct. 28, 1966, Ser. No. 598,577
Int. Cl. C03c 21/00
U.S. Cl. 65—30    9 Claims

ABSTRACT OF THE DISCLOSURE

This invention relates to a method for strengthening glass. More particularly, the invention relates to an improvement in a method of chemically treating an alkali metal containing glass article with a salt of an alkali metal with a larger atomic diameter than the alkali metal of the glass to increase the strength of the article, said improvement pertaining to a method of maintaining a low concentration of the alkali metal of smaller ionic diameter in admixture with the salt of the alkali metal of larger atomic diameter. The invention especially pertains to a method of effectively removing from the treating bath or rendering insoluble the contaminating smaller alkali metal ion, for example, lithium in a sodium salt bath, in order to maintain the concentration of said smaller ion sufficiently low in order to consistently produce high strength glass.

---

Figure 1:
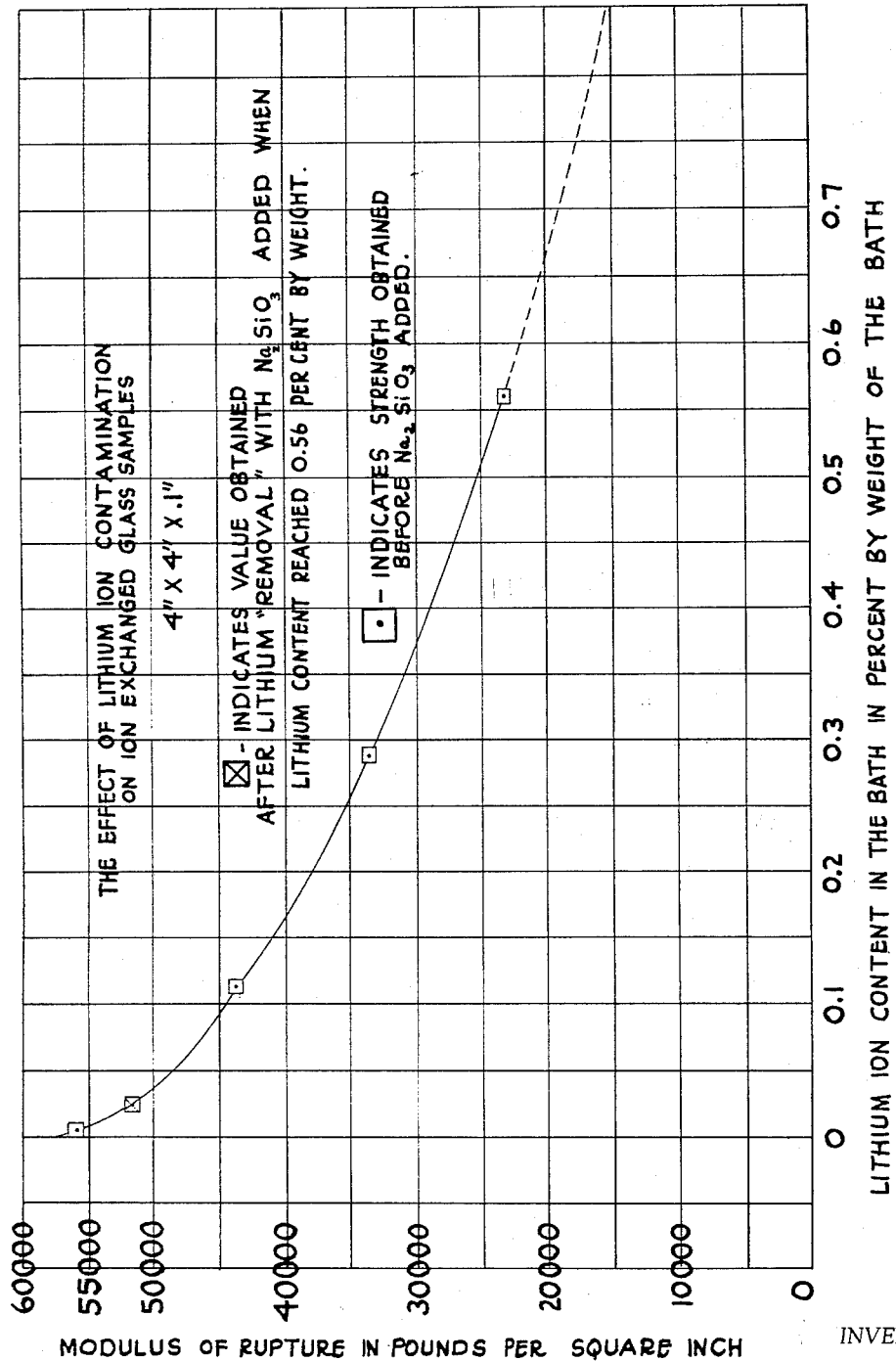

The present application is a continuation-in-part application of copending application Ser. No. 388,371, filed Aug. 10, 1964, by Hess, now abandoned.

It is known that glass articles of greatly enhanced surface compressive stress, and hence load strength, can be produced by contacting glass containing a substantial quantity of an alkali metal of a relatively small atomic diameter with a salt of an alkali metal of a larger atomic diameter than the alkali metal of the glass at a temperature below the strain point of the glass. The alkali metal containing glass prior to being strengthened may contain alkali metals of various atomic diameters; in fact, the alkali metal of smaller atomic diameter may not be the predominant alkali metal present. However, to produce a highly strengthened glass article it is preferred that the smaller alkali metal be the predominant alkali metal in the unstrengthened glass. The total quantity of alkali metal oxide in an alkali metal containing glass will usually be in the range of 5 percent to 20 percent by weight of the glass composition although lower or higher quantities are not uncommon. The preferred glasses for strengthening by ion exchange techniques contain the smaller alkali metal as an oxide in quantities of about 2 percent by weight and preferably about 3 percent by weight of the glass composition.

The process requires the ion exchange (fused salt) bath to be in contact with the glass for a sufficient period of time to introduce the larger atomic diameter alkali metal into the surface of the glass in place of the smaller alkali metal. Since this is accomplished below the relaxation (strain) point of the glass, the surface structure does not completely adjust itself to accommodate the larger size ion which has been forced into it, thereby resulting in the development of a high compressive stress in the glass surface when the glass article is cooled to room temperature. Typical treatments where a lithium glass is treated in a sodium nitrate bath are disclosed in Republic of South Africa Patents Nos. 622,352, 622,353, and 622,354 and in copending application of Dale W. Rinehart, U.S. Ser. No. 293,271, filed July 8, 1963.

In accordance with the present invention, it has been found that in such ion exchange treatments, the strengthening effect of the salt bath diminishes over a period of time as more and more glass is treated. It has also been found that the concentration of alkali metal ions removed from the glass increases in the bath with continued use of the bath and that this increase in concentration is correlated to the decrease in the strengthening effect of the bath. This has been found to be especially true when lithium-containing glasses are strengthened by an ion exchange technique.

The present invention consists of effectively removing from the treating bath or rendering insoluble the contaminating lithium ion or other alkali metal ion displaced from the glass whereby the concentration of the said ion is maintained sufficiently low to produce strengthened glass articles of consistently high strength.

Lithium-containing glass is preferably strengthened by treating it with a sodium salt, wherein the sodium salt bath should contain as low a lithium ion concentration as is possible in order to promote only the desired ion exchange reactions, the preferred exchange being the sodium for lithium ion exchange which results in the increased strength of the glass. If lithium ions are present in the treating bath, a lithium for lithium, or lithium for sodium ion exchange may occur which does not produce the necessary compressive stress in the glass surface. The probability of producing undesirable ion exchanges which do not promote strength increases as the amount of lithium ion in the treating bath increases.

The depth to which ion exchange occurs is proportional to the square root of the time of immersion of the article being strengthened in an ion exchange bath, provided the treatments are carried out at the same temperature. This is true for all ion exchange baths with or without decontamination means. The amount of compressive stress which can be produced in the glass surface will vary, however, because the ion exchange bath without the decontamination means will have a higher percentage of lithium for lithium, or lithium for sodium, ion exchanges taking place. While the lithium for lithium ion exchange is merely a wasted reaction in that no stress of any type is produced, the lithium for sodium ion exchange reaction is actually a step backward in the strengthening process since such an ion exchange tends to produce a tension stress in the surface of the glass article being treated.

The total amount of ion exchange which occurs is, therefore, not the significant or controlling factor in strengthening the glass, but instead, it is the ratio of sodium for lithium ion exchanges to other types of ion exchanges which occurs in the surface layer that determines how much strength improvement is realized.

It has been discovered that the net amount of desirable ion exchange is directly related to the concentrations of the ions available for exchange in the bath. The higher the concentration of sodium ions in the treating bath, as compared to the concentration of lithium ions, the higher will be the sodium for lithium ion exchange. The techniques of the present invention control the amount of lithium ion build-up in the bath thereby keeping the concentration of sodium ions sufficiently high to maintain an effective ion exchange treating bath for extended periods of time.

The build-up of lithium ion contamination in a sodium nitrate salt bath that does not contain a lithium decontamination means is sufficiently rapid to decrease the extent of sodium ion replacement below acceptable levels in a relatively short period of treating time. To maintain a lengthy continuous or discontinuous ion exchange operation in which lithium-containing glasses are contacted with a bath of sodium nitrate at elevated temperatures, the displaced lithium ions must be tied-up or otherwise removed from the bath to keep the sodium nitrate bath effective as a glass strengthening ion exchange medium.

It has been found that the degree of sodium for lithium ion replacement occurring in the surface of a glass article being treated becomes reduced below an acceptable level for most commercial applications whenever the lithium ion concentration in the bath becomes greater than about 0.04 weight percent of the total weight of the alkali salts present. The value of 0.04 percent by weight of lithium ion contamination is not a rigid upper limit for all products, however. The amount of strength improvement desired sets the upper limit on the lithium ion concentration. If less strength improvement is acceptable, the lithium concentration may be allowed to reach a higher level, preferably below about 0.06 percent by weight, although a concentration of about 0.1 percent by weight or slightly higher can be tolerated in many circumstances. The present invention adequately controls and maintains the lithium ion concentration at a sufficiently low level to enable much more glass surface area to be suitably strengthened before replenishment or replacement of the treating bath becomes necessary than was previously possible using treating baths that did not have a decontaminating means.

The present invention is an improvement upon ion exchange process for strengthening alkali metal containing glasses by replacement of an alkali metal of the glass with a larger alkali metal, said larger alkali metal being provided from a fused alkali metal salt in contact with said glass, the improvement comprising maintaining in the fused alkali metal salt a high ratio, the larger alkali metal ions to the smaller alkali metal ions. Several techniques can be utilized for controlling the concentration of the smaller alkali metal ion in the fused alkali metal salt, including (1) interacting the smaller alkali metal ion with an appropriate anion to form a volatile compound at the temperatures of the fused salt; (2) electrolytic removal of the smaller alkali ion; (3) precipitation of the smaller alkali metal ion by interaction with an appropriate anion; and (4) ion exchange of the smaller alkali metal ion with a larger ion from a solid, insoluble material thereby rendering insoluble the smaller alkali metal ion and releasing a non-contaminating ion.

Of these techniques, the preferred method comprises the addition of an insoluble material to the fused alkali metal salt which undergoes ion exchange with the smaller alkali metal ion to effectively absorb the smaller alkali metal ion and to release a non-contaminating larger alkali metal ion. This type of decontaminating agent is generally a high molecular weight, alkali metal-containing inorganic compound. The following materials are illustrative of decontaminating agents of this type:

sodium metasilicate
sodium orthosilicate
sodium orthophosphate
sodium tetraborate
potassium metasilicate
potassium orthosilicate
potassium orthophosphate
potassium tetraborate
cesium metasilicate
cesium orthophosphate
rubidium orthosilicate
soda-lime-silicate
potassia-lime-silicates
sodium aluminosilicates
alkali metal-containing clays
soda feldspar
zeolites and the like. The soda-lime-silicate and potassia-lime-silicates mentioned include, for example, glasses having the following composition: $Na_2O$—0—20%; $K_2O$—0—20%; $SiO_2$—30—60%; $CaO$—0.1—1.0% plus additional ingredients. Any alkali metal glass capable of undergoing an ion exchange reaction with a smaller alkali metal ion would be useful, however.

The decontaminating agents contemplated in this invention are effective because they react or undergo exchange with the smaller alkali metal to form a compound or structure which does not substantially dissociate or ionize.

In the present invention, the preferred decontaminating agent especially for sodium salt baths is a sodium containing material such as sodium metasilicate ($Na_2SiO_3$). The sodium metasilicate is added as a powder to the sodium nitrate bath. The sodium metasilicate remains as a powder during the ion exchange operation.

When the sodium metasilicate comes in contact with the lithium ions in the salt bath, it reacts or undergoes exchange with them to produce lithium metasilicate ($Li_2SiO_3$) and sodium ions. The formation of insoluble lithium metasilicate results in the effective removal of the lithium ions from the salt bath. The presence of the lithium in this form in the bath does not adversely affect the strengthening ability of the bath as compared to the prior art treatment. By removal, therefore, is meant the changing of the lithium from the ionic form to a form in the bath which is not harmful to the strengthening effect. Physical removal can occur when the lithium metasilicate is removed from the bath.

It is preferred to utilize an anhydrous decontaminating agent to eliminate problems which may arise in the control of the treating bath due to the release of the water of hydration from a hydrous compound. It is possible to use hydrous sodium metasilicate as the decontaminating additive but a slower heating rate of the treating bath must be adopted to prevent violent bubbling in the treating bath as the water of hydration is released.

It has been observed that the particle size of the sodium metasilicate added to the sodium nitrate bath gradually decreases as it reacts with lithium ions in the bath. It is theorized that the exchange of sodium for lithium taking place at the surfaces of the sodium metasilicate particles in some manner causes the surfaces to crumble away, thereby exposing the interior of the particles for additional decontamination reaction. This particle size reduction is a unique and highly beneficial property and could be one reason why materials such as sodium or potassium metasilicate are very efficient decontamination agents.

The particle size of the sodium metasilicate added to the bath can vary over a fairly wide range due to the crumbling phenomenon that takes place at the surfaces of the particle as the reaction proceeds. The rate at which the lithium ion is insolubilized is related to the surface area of the decontaminating agent in contact with the bath. To have a reasonably rapid decontamination rate it has been found that sodium metasilicate particles of between about 125 and 840 microns, with a median particle size of about 400 microns, are desirable. Other decontaminating materials which do not undergo a crumbling phenomena are preferably utilized as small particles, for example, in the size range of about 50 to about 500 microns.

The amount of decontaminating agent added to the ion exchange bath is not critical. The more decontaminating material added to the bath, the longer will be the effective period of the ion exchange salt before regeneration of the treating bath is necessary. The upper limit is only dependent upon the inconvenience of having a large amount of solid materials present in the treating tank, which may physically limit the ability of the treating bath to contact the glass surface being treated. Convenient amounts of decontaminating agents added to the treating bath for most operations range from 1.0 weight percent to 20.0 weight percent of the total weight of the treating bath. Of course, the decontaminating agent need not be added directly to the treating bath, but may be disposed in a separate container having the fused salt circulated through it.

It is to be understood that while the description of this invention has primarily been explained in terms of removing lithium ions from a fused sodium salt, the invention is effective in controlling any time of contamination by smaller alkali ions; for example, lithium or sodium ions could be removed from a fused potassium salt by potassium metasilicate, potassium ions could be removed from a fused cesium salt by cesium orthophosphate and, of course, the smaller ion may be removed by electrolysis, precipitation, or volatilization as described hereinabove.

This invention can be further understood by reference to the examples which set forth the best mode contemplated by the inventor for carrying out his invention.

EXAMPLE I

The following equipment was utilized in the practice of the present invention. Ion exchange treating tanks were constructed by fabricating two adjacent rectangular stainless steel containers, each measuring approximately 2¼ inches by 10 inches by 8 inches. The stainless steel containers were provided with built-in electrical resistance heaters and controls. Two separate baths of sodium nitrate salts were prepared by heating 4,400 grams of sodium nitrate in each of the tanks. No provision was made to stir the salt baths during the ion exchange treatments. Natural convection which developed in the salt bath due to differences in temperature in the various parts of the bath was found to be adequate to circulate the lithium ions in the bath. Mechanical stirring could be used if the rate of lithium ion removal is found to be too slow.

In one tank, hereinafter referred to as Tank No. 2, 220 grams of anhydrous sodium metasilicate (5 percent by weight of the $NaNO_3$) was added to the bath. Both of the salt baths were then heated to a temperature of 850° F. and maintained at that temperature throughout the period of the treatments described below.

Tables I and II compare the levels of the lithium ion content in the two salt baths and the effect of the lithium ion content on the strength of the glass samples treated. The base glass calculated composition used to fabricate the glass samples was as follows:

| Oxide, component: | Percent by weight |
|---|---|
| $SiO_2$ | 44.38 |
| $Al_2O_3$ | 26.61 |
| $Li_2O$ | 5.04 |
| $Na_2O$ | 11.00 |
| $P_2O_5$ | 9.96 |
| ZnO | 3.00 |

Each batch treatment consisted of immersing two 3⅛ inch by 3⅛ inch by 1/10 inch samples of the base glass composition indicated in each molten salt bath. The immersion time for the samples was 90 minutes for each batch treatment.

TABLE I
[Bath I Untreated]

| Sample No. | Cumulative Glass Area Treated Square Feet | Bath I ($NaNO_3$) Li+Content Percent by Weight | Modulus of Rupture Pounds per Square Inch |
|---|---|---|---|
| U-1 | 0.5 | 0.007 | 45,000 |
| U-2 | 1.0 | 0.014 | 46,500 |
| U-3 | 1.5 | 0.021 | 46,500 |
| U-4 | 2.0 | 0.027 | 48,000 |
| U-5 | 2.5 | 0.034 | 48,100 |
| U-6 | 3.0 | 0.040 | 44,000 |
| U-7 | 3.5 | 0.046 | 42,000 |
| U-8 | 4.0 | 0.052 | 39,000 |

TABLE II
[Bath II Treated]

| Sample No. | Cumulative Glass Area Treated Square Feet | Bath II ($NaNO_3$+$Na_2SiO_3$) Li+Content Percent by Weight | Modulus of Rupture Pounds per Square Inch |
|---|---|---|---|
| T-1 | 0.5 | 0.005 | 50,000 |
| T-2 | 1.0 | 0.008 | 47,000 |
| T-3 | 1.5 | 0.011 | 49,000 |
| T-4 | 2.0 | 0.012 | 49,250 |
| T-5 | 2.5 | 0.010 | 50,750 |
| T-6 | 3.0 | 0.012 | 46,000 |
| T-7 | 3.5 | 0.011 | 46,500 |
| T-8 | 4.0 | 0.012 | 47,000 |

As can be seen in Table II, strength remains consistently high for even extended periods of time in the treated ion exchange bath and in all cases, for equivalent areas of glass treated, the samples ion exchanged in the bath containing sodium metasilicate exhibited higher modulus of rupture strengths.

It is surprising that all glass samples treated in the ion exchange bath which contained sodium metasilicate exhibited higher modulus of rupture strengths than glass samples treated in the ion exchange bath which did not contain sodium metasilicate. In the instances where equivalent total glass areas had been treated in the two baths it was unexpected that the treated bath would consistently impart improved strength particularly early in the treating campaigns before the lithium content in the untreated bath was built up to an appreciable level. The mechanism of the strength improvement where the lithium contamination is very low in both the treated and untreated baths is unknown but it is clear that regardless of the lithium content, it is always advantageous to incorporate sodium metasilicate in the ion exchange bath.

The strength measurements were conducted using the concentric ring load test on the 3⅛ inch by 3⅛ inch by 1/10 inch samples. The concentric ring load test consists of supporting the sample to be tested on a 3-inch diameter steel ring above which 1½ inch diameter steel ring is placed to contact the center of the specimen. The load is applied by lowering the ¾-inch ring onto the sample and the modulus of rupture is calculated correcting for membrane effects and overhang of the sample.

EXAMPLE II

Another embodiment of the present invention comprises preparing samples 4 inches by 4 inches by 1/10 inch thick from the same base glass composition described in Example I. An ion exchange bath consisting of 7,800 grams of sodium nitrate was melted in one tank of the same apparatus utilized in Example I. Five of the glass samples at a time were ion exchanged in this sodium nitrate bath at 850° F. for a period of 90 minutes. Four sets of five samples each were ion exchanged in the treating bath during which time the lithium ion content was allowed to increase as the treatment of the glass samples proceeded. FIGURE 1 shows the results of the increase in lithium ion concentration in the treating bath upon the modulus of rupture exhibited by the samples. Each point plotted on the curve of FIGURE 1 represents the average strength of the five samples treated at the lithium ion content indicated.

The samples were tested utilizing the concentric ring loading test described in Example I. The measured values for the modulus of rupture were adjusted to correct for overhang and membrane effects and then plotted on FIGURE 1.

When the lithium ion contamination in the treating bath reached 0.56 weight percent of the total weight of the bath, sodium metasilicate was added to rejuvenate the bath. The point designated ⊠ represents the average strength exhibited by five samples after the ion exchange bath was rejuvenated to 0.023 percent lithium by weight with anhydrous sodium metasilicate.

Figure 2:
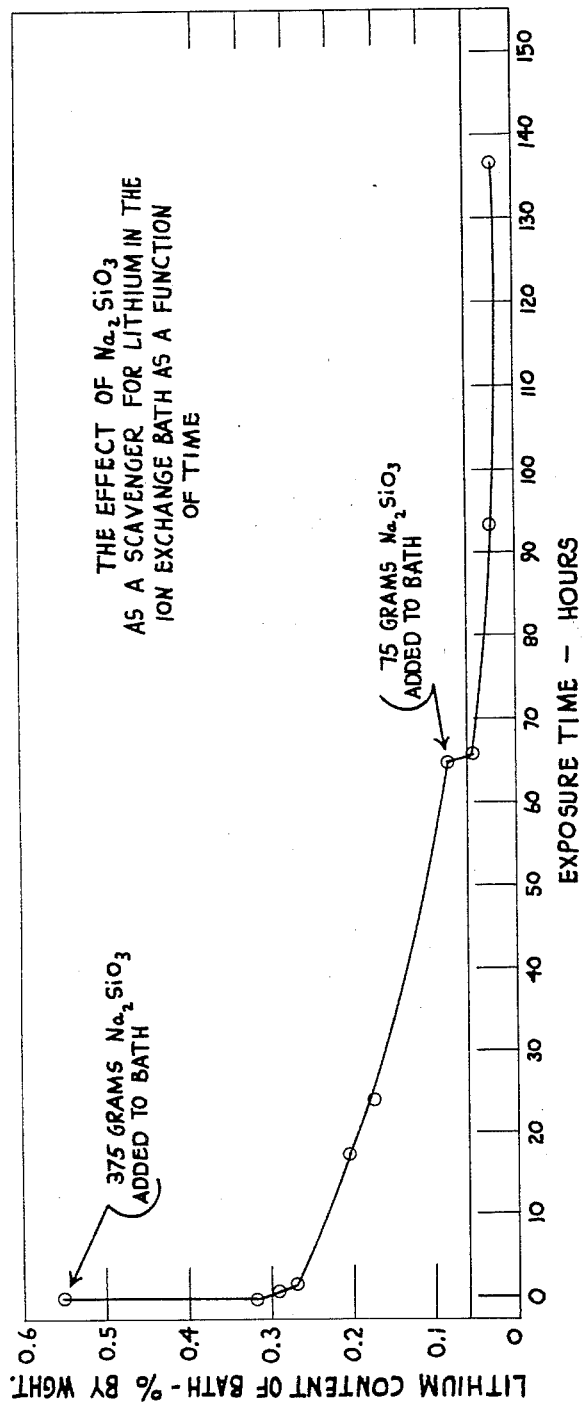

FIGURE 2 depicts the effectiveness of anhydrous sodium metasilicate as a lithium decontaminant. As indicated in FIGURE 2, the sodium metasilicate was added in two steps, Step 1 being an addition of 375 grams of sodium metasilicate to the bath. The bath was allowed to stand at 850° F. for 65.5 hours after which time the lithium ion content in the bath had been decreased to 0.082 weight percent. Approximately one half of the lithium ion contamination was removed during the first ten hours of the waiting period. Step 2 consisted of adding an additional 75 grams of sodium metasilicate to the bath and allowing the bath to stay at 850° F. for another 70 hours which resulted in the lithium ion contamination being reduced to 0.025 percent of the total weight of the bath.

Although the present invention particularly relates to a method for removing lithium ions from a sodium salt bath by incorporating a decontamination material in the bath such as sodium metasilicate, the method is also applicable to the removal of other alkali metal ions which are present as contaminants in an alkali metal salt bath of a different larger atomic diameter alkali metal.

It would not be a departure from the teachings of the present invention to remove lithium ions from a potassium metal salt bath used to ion exchange glass surfaces by adding potassium metasilicate as the decontaminating agent since potassium behaves very similarly to sodium in such a chemical operation. Nor would it be a departure from the teachings herein presented to remove sodium ions from a potassium metal salt bath used to treat a lime-soda-silica glass by adding potassium metasilicate to the bath to act as a decontaminating agent for the sodium, since sodium ions behave chemically as do the lithium ions.

It is similarly not a departure to use mixtures of two or more alkali metal compounds as the constituents of the ion exchange bath or the decontaminating material. Various combinations of the alkali metal compounds disclosed will behave as the chemical equivalents of the single alkali metal compounds preferred.

In addition to the materials previously mentioned as decontaminating agents, other materials may also prove workable. A suitable equivalent material is any substance which exists as a solid in the alkali metal salt bath or which precipitates in the bath at the temperatures used to ion exchange the glass and which forms a more stable compound than the substance itself of the alkali metal ion desired to be removed from the bath.

The temperature at which the present invention can be practiced is not limited to the temperature of 850° F. used in the preferred embodiment. The process can be conducted at any temperature above the melting point and below the decomposition point of the alkali metal salt used as the predominant constituent of the ion exchange treating bath. The decontamination action in the ion exchange bath is independent of the strain point of the glass bein gtreated and need not be conducted simultaneously with the ion exchange treatment of the glass. The decontamination reaction rate can be increased by increasing the temperature of the treating bath between ion exchange treatments of glass if the rate of contamination is found to exceed the rate of decontamination at the temperatures employed for the ion exchange. A preferred method, particularly in a continuous treating operation, would be to circulate the ion exchange salt from the treating bath through a decontamination unit at a temperature which promotes the decontamination reaction and then returning said salt to the treating tank at the optimum ion exchange temperature.

The alkalinity of the ion exchange treating bath has little or no effect on the decontamination reaction. Alkalinity need not be controlled unless the glass being produced starts to exhibit poor weathering durability or begins to be partially etched by the bath.

Although the present invention has been described in the examples with respect to a particular glass, the invention is not limited in its application to the ion exchange treatment of said glass. In its broadest application, the invention may be used for the exchange treatment of many alkali-metal containing glasses, such as alkali metal-silicate glasses. As for lithium-containing glasses, reference can be made to the above-mentional patents and application which are incorporated herein by reference.

EXAMPLE III

This example illustrates the use of soda-lime-silicate cullet as a means for reducing the lithium ion content in a sodium nitrate bath contaminated with lithium ion. To a bath containing about 470 grams of sodium nitrate was added about 14 grams of lithium nitrate which resulted in a lithium ion concentration of about 0.29 percent by weight. This mixture of salts was then melted and about 24.3 grams of cullet having a particle size of about 12 to 16 mesh were added to the molten mass. The temperature of the molten bath was maintained at about 850° F. and the lithium ion concentration was reduced from an initial value of about 0.29 percent by weight lithium ion to about 0.26 percent by weight of lithium ion in a period of about 20 hours.

The effectiveness of sodium-containing glass cullet as a means of reducing lithium ion content of a sodium salt bath was shown. The lithium ion concentration could be reduced to the desired level for operation of ion exchange bath by addition of more cullet or replacement of the expended cullet with fresh cullet.

One means of effectively utilizing cullet as a means for reducing lithium ion concentration of a fused salt bath is to utilize the cullet in a container exterior to said bath and circulate the fused salt through the cullet.

EXAMPLE IV

This example illustrates the effectiveness of sodium orthosilicate ($Na_4SiO_4$) as a means of reducing the lithium ion concentration in a fused salt bath. About 500 grams of sodium nitrate and 25 grams of sodium orthosilicate were admixed in a stainless steel beaker and melted by heating to 850° F. To this molten bath about 9.0 grams of lithium nitrate (0.9 grams lithium ion) were added and the mixture was allowed to stand for about 16 hours. The quantity of lithium added to the bath represented about 0.18 percent by weight; however, upon analyzing for lithium ion at the end of the 16 hours, the lithium content was discovered to be about 0.017 percent by weight lithium ion. This indicated that the sodium orthosilicate had absorbed or reacted with about 90 percent of the lithium ion present in the bath.

Another 9.0 grams of lithium nitrate were added to the bath and the mixture was allowed to stand for about 48 hours. At the end of this period, a lithium analysis was made and a concentration of 0.02 percent by weight lithium ion was detected. This indicated that the sodium orthosilicate had maintained the lithium ion concentration at a low level and had reacted with about 100 percent of the lithium ion added by the second addition of lithium nitrate.

A third addition of 9.0 grams of lithium nitrate was made to the molten salt bath and the mixture was allowed to stand for about 16 hours. At the end of this period a lithium concentration of 0.12 percent by weight of lithium ion was detected in the salt bath.

The three additions of lithium nitrate would have resulted in a total lithium concentration in the salt bath of 0.54 percent by weight of lithium ion. However, the sodium orthosilicate absorbed or reacted with about 80 percent of the lithium ion added to the bath allowing the lithium ion concentration in the bath to be only 0.12 percent by weight of lithium ion. This indicates the effectiveness of sodium orthosilicate as a means of maintaining a low lithium ion concentration in a fused alkali metal salt bath.

EXAMPLE V

This example illustrates the effectiveness of sodium orthophosphate ($Na_3PO_4$) as a means for reducing the lithium ion concentration in a fused alkali metal salt bath. To a bath containing about 500 grams of molten sodium nitrate and having a lithium ion concentration of 0.04 percent by weight was added about 25 grams of sodium orthophosphate. The mixture was maintained in a molten condition and allowed to stand for a period of about 16 hours. At the end of this period, the lithium ion content of the bath was determined by analytical techniques to be about 0.002 percent by weight lithium ion. This indicated that the sodium orthophosphate was extremely effective in reducing the lithium ion concentration present in the fused salt bath.

EXAMPLE VI

To illustrate the effectiveness of sodium tetraborate ($Na_2B_4O_7$), about 25.4 grams of sodium tetraborate were added to a molten salt bath containing about 493 grams of sodium nitrate and about 14.8 grams of lithium nitrate.

The original lithium ion concentration was about 0.286 percent by weight. About one half hour after the sodium tetraborate addition, the lithium ion content had been reduced to about 0.178 percent by weight lithium ion and after about 3½ hours, the lithium ion concentration was about 0.147 percent by weight. About 90 hours after the sodium tetraborate addition, the lithium ion content of the bath was about 0.107 percent by weight. At the end of 112 hours, the lithium ion content was about 0.117 percent by weight, indicating that the sodium tetraborate was spent.

The utilization of sodium tetraborate in larger concentrations enables the operation of ion exchange bath at less than about 0.04 percent by weight lithium ion concentration.

I claim:

1. A method of strengthening in an alkali metal containing glass article which contains a substantiall quantity of an alkali metal ion of relatively small atomic diameter which comprises contacting the glass article at an elevated temperature but below the strain point of the glass with a molten alkali metal salt having an alkali metal ion of relatively large atomic diameter for a sufficient period of time to cause ion exchange, the improvement comprising contacting the alkali metal salt with a decontaminating material that effectively removes from the alkali metal salt relatively small diameter alkali metal ions.

2. A method according to claim 1 in which the relatively small atomic diameter alkali metal ion is lithium ion and the relatively large atomic diameter alkali metal ion is sodium ion.

3. A method according to claim 1 in which the decontaminating material is an alkali metasilicate.

4. A method according to claim 2 in which the relatively large atomic diameter alkali metal salt is sodium nitrate.

5. The method of claim 2 wherein the decontaminating material is sodium metasilicate.

6. The method of claim 2 wherein the decontaminating material is anhydrous sodium metasilicate.

7. An improved method of strengthening an alkali metal containing glass article which contains a substantial quantity of an alkali metal ion of relatively small atomic diameter which comprises contacting the glass article at an elevated temperature but below the strain point of the glass with an alkali metal salt having an alkali metal ion of relatively large atomic diameter for sufficient period of time to cause ion exchange, said improvement comprising controlling the concentration of alkali metal ion of smaller atomic diameter in the alkali metal salt at less than about 0.1 percent by weight of the total alkali metal salts present by contacting the alkali metal salt with a decontaminating material that effectively removes from the alkali metal salt small diameter alkali metal ions.

8. The method of claim 7 wherein the concentration of alkali metal ions of smaller atomic diameter in the alkali metal salt is controlled at less than about 0.004 percent by weight of the total alkali metal salts present.

9. The method of claim 1 wherein the decontaminating material is selected from the class consisting of sodium orthosilicate, sodium metasilicate, sodium orthophosphate and sodium tetraborate.

References Cited

UNITED STATES PATENTS 3,287,200   11/1966   Hess et al. _____ 65—111

DONALL H. SYLVESTER, *Primary Examiner.*

ROBERT L. LINDSAY, JR., *Assistant Examiner.*

U.S. Cl. X.R.

65—116